United States Patent [19]

Post

[11] Patent Number: 5,422,830
[45] Date of Patent: Jun. 6, 1995

[54] METHOD FOR TRACKING A MANEUVERING TARGET WITH A SLOW SCAN RATE SENSOR

[75] Inventor: Edwin L. Post, Baldwinsville, N.Y.

[73] Assignee: Martin Marietta Corporation, Syracuse, N.Y.

[21] Appl. No.: 3,275

[22] Filed: Jan. 12, 1993

[51] Int. Cl.6 ............................................. G06F 15/20
[52] U.S. Cl. .................................................. 364/516
[58] Field of Search .................. 364/514, 516; 342/90, 342/94, 95, 96; 235/411, 412, 413

[56] References Cited

U.S. PATENT DOCUMENTS

| | | | |
|---|---|---|---|
| 3,699,573 | 10/1972 | Andrews et al. | 342/95 |
| 3,866,229 | 2/1975 | Hammack | 364/516 |
| 4,549,211 | 10/1985 | Assael et al. | 364/516 |
| 5,001,650 | 3/1991 | Francis et al. | 364/516 |

Primary Examiner—Ellis B. Ramirez
Attorney, Agent, or Firm—Paul Checkovich; Stephen A. Young

[57] ABSTRACT

When the scan interval or time between successive potential detections is long with respect to a potential target's maneuvering capability (say on the order of ten seconds for a radar system), there is the possibility that the target may be able to deviate far enough away from its last detected position at scan i-1 that correlation of the target with a detection in scan i may not be possible using conventional tracking methods. The present invention uses a maneuvering gate to monitor a volume in space. The volume is bounded by intersecting ellipsoids and is disposed, preferably uniformly about the target's last estimate velocity vector. The surfaces of the ellipsoids which bound the volume may be determined by determining the loci of a combination of a straight and turning maneuver at a predetermined acceleration, which acceleration may be selected to be the maximum acceleration expected to be achievable by a predetermined target. When target correlation is disturbed or lost, the volume is examined. A detection in the volume is correlated to the target.

13 Claims, 2 Drawing Sheets

METHOD FOR TRACKING A MANEUVERING TARGET WITH A SLOW SCAN RATE SENSOR

BACKGROUND OF THE INVENTION

The present invention relates to a method for tracking a maneuvering target with a slow scan rate sensor, and, more particularly, to tracking a highly maneuvering target without overburdening the target processing capabilities of a tracking system using such a sensor.

By "slow scan rate" is meant a scan rate, wherein a target monitoring or sensor system, such as a radar antenna or sonar hydrophone, examines a predetermined volume in space and returns to the same volume relative to the sensor in a time interval which is long relative to the anticipated or maximum velocity acceleration and maneuvering capability of a potential target. By way of example and not of limitation, a known radar system employs an antenna which is rotated or slewed through 360° in about ten seconds. Thus for a stationary target, the sensor would return to the subject detection volume nominally every 10 seconds depending on the sensor platform or own ship motion, if any.

For certain current jet aircraft or missiles which may be desired to be detected and tracked, an interval as long as ten seconds between obtaining updated actual target position information may permit the target to maneuver far enough away from its previous historical position and path so that a next interval detection using a conventional system cannot be reliably correlated or determined to be the same target.

Tracking targets through their maneuvers is a classical tracking problem solved by conventional tracking algorithms. Successful target track is typically the result of frequent updates of target position during any maneuver. Slow scanning sensors do not provide the required frequent target updates for conventional trackers to maintain track on maneuvering targets. Within one scan interval of a slow scanning sensor, a maneuvering target, like a cruise missile, can initiate, perform, and terminate a large acceleration or high g turning maneuver away from its previous position and course. The term g is used to refer to acceleration in terms of a multiple of the acceleration due to gravity which is nominally 9.8 m/sec$^2$ On the next scan, the target location may be a significant distance from the location predicted by the tracker from historical data of a predetermined number of prior scans and the target may be headed on a drastically different course from the one derived from such historical data. Either or both of these events may defeat the performance of conventional target correlation and tracking algorithms when employed in conjunction with a slow scanning sensor.

Previously developed scan-to-scan correlation methods for use with slow scanning sensors have exhibited a number of deficiencies such as excessive false alarms, target tracking limitations and/or intermittent target tracking. Some slow scan tracking methods employ small correlation gates to restrict the probability of false correlation, thereby limiting the false track report rate. These trackers do not have the capability to track maneuvering targets because of the insufficient size of the gates. Other tracker developments for use with such sensors have utilized large, non-optimally shaped correlation gates which can track maneuvering targets but which permit an excessive number of false correlations and false target reports. Further, use of such large gates inefficiently consumes target processing resources of the overall system, such as a radar or sonar by examining portions of a spatial volume where there is a low probability of finding the historically tracked target.

SUMMARY OF THE INVENTION

In accordance with the present invention, a method for tracking a target includes providing a maneuver gate to monitor a predetermined volume disposed about a velocity vector of the target, wherein the volume is bounded by inner and outer intersecting ellipsoids, examining the volume for a potential detection when target correlation has been disturbed or lost and correlating the target with the detection when the detection lies within the volume. The volume may be symmetrically disposed about the target's velocity vector. The direction of the velocity vector may be determined by extrapolation of the target's last known velocity vector or direction.

The step of correlation may include determining if the detection is outside the inner ellipsoid, determining if the detection is inside the outer ellipsoid and include the detection to lie within the volume when the detection is both outside the inner ellipsoid and inside the outer ellipsoid. The volume may be a volume of revolution about the vector.

One ellipsoid may represent the loci of an object after proceeding in the direction of the vector for a first predetermined time and then proceeding in a turn having a first predetermined acceleration for a second predetermined time. The first predetermined acceleration may be chosen to be the maximum acceleration that the target is expected to be able to achieve. The first time may precede the second time. The sum of the first and second times may be equal to a scan interval of a tracking and/or a detection system. The first predetermined time may proceed the second predetermined time for one ellipsoid and the second ellipsoid may represent the loci of the object after proceeding in a turn having a second predetermined acceleration for a third predetermined time and then proceeding in a straight path for a fourth predetermined time. The second predetermined acceleration may likewise be chosen to be the maximum acceleration that the target is expected to be able to achieve. The sum of the third and fourth times may be equal to a scan interval of a tracking and/or detection system.

Although the present invention may be particularly useful in a radar system, its use is not so limited and it may be employed in other tracking and/or detection systems, such as a sonar, infrared search and track (IRST) or any other one which uses energy from a target (such as may be generated by or reflected therefrom) to track the target.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
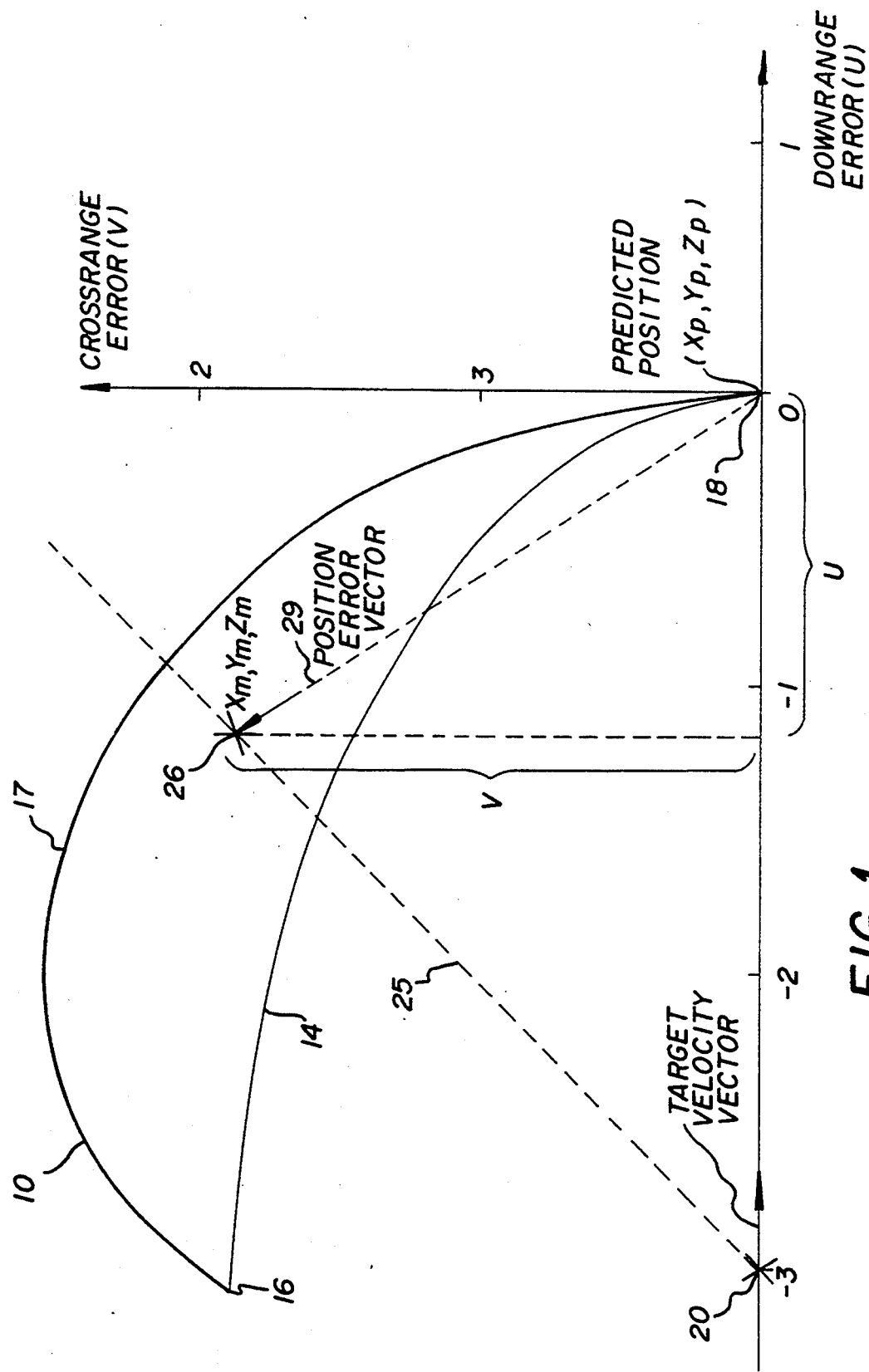
FIG. 1 is a graph of a portion of a representative maneuver correlation gate in accordance with the present invention.

Referring to FIG. 1, a graph of a portion of a representative maneuver correlation gate in accordance with the present invention is shown.

A portion of the spatial volume to be monitored by correlation gate 10 is illustrated in cross section in FIG. 1. Actually, correlation gate 10 monitors a symmetrical volume disposed about the abscissa or downrange error (U) axis, so that the volume monitored by gate 10 may be considered to be a volume of revolution about the abscissa. The abscissa is disposed to lie coincident with or tangential with, the velocity vector of the target at the target's last detected position. The volume of revolution for gate 10 is bounded by an ellipsoid having surface 12 and another ellipsoid having surface 14. For convenience and ease of discussion surface 12 will be referred to as the outer surface and surface 14 will be referred to as the inner surface. Surfaces 12 and 14 intersect at the origin 18, and about the abscissa along a circle 16 which is represented as a point in the presentation of FIG. 1. The ordinate is designated as the cross range error (V) and is orthogonal to the abscissa, or normal to the velocity vector of the target. The range intervals shown along the ordinate and the abscissa are of the same magnitude.

For purposes of this discussion a target X is assumed to be located in space such that its position at time t or scan i-1 may be represented at point 20 which lies on the abscissa. Further, it is assumed that from a historical track and extrapolation, target X will be at point 18 at time t+1 or scan i if it maintains a constant course and velocity from point 20. The abscissa is disposed so that it lies coincident with the estimated velocity vector direction of target X at point 20. The scan time, or scan interval, of the sensor is represented by T.

For determining the position and orientation of boundaries 12 and 14 the following parameters were used based on apriori assumptions of expected target capabilities: maximum target acceleration constant at 10 g's; target speed constant at 0.3 km/sec; scan interval of 10 seconds. These values may not be fixed for all cases. The maximum target acceleration constant may be operator selectable or determined so that the operator may refine the shape of gate 10, for example, based on other information about potential targets that may be available to the operator. Of course, other parameter values and flyout scenarios may be chosen for determining other boundary surfaces by one of ordinary skill in the art in accordance with the teachings herein.

Surface 14 represents a first flyout scenario wherein the target at point X immediately after detection at scan i-1 continues for a predetermined amount of time to fly straight and then commences and maintains a constant 10 g turn for the remainder of the scan interval. In a first representative case for the first flyout scenario, when the time of the straight flight continuation after detection is zero, the target will be in a constant 10 g turn during the entire scan interval, so that at the end of the scan interval, i.e. at scan i, the target will be on circle 16. Likewise, in a second representative case for the first scenario, if the target continues in straight flight for the entire scan interval, then the time for turning will be zero and the target will be at point 18 at the end of the scan interval. Surface 14 from point 18 represents the loci of potential target locations as the turning time for the first scenario increases from zero to the full scan interval.

Surface 12 represents a second flyout scenario wherein the target at point X immediately after detection at scan i-1 commences and maintains a 10 g turn for a predetermined amount of time and then begins to fly straight for the remainder of the scan interval. In a first representative case for the second flyout scenario, when the time of the turn after detection is zero, the target will fly straight during the entire scan interval, so that at the end of the scan interval, i.e. at scan i, the target will be at point 18. Likewise, in a second representative case for the second scenario, if the target continues in a 10 g turn for the entire scan interval, then the time for straight flight will be zero, so that at the end of the scan interval the target will be on circle 16. Surface 12 from point 18 represents the loci of potential target locations as the turning time for the second scenario increases from zero to the full scan interval.

If the selected value of the parameters of the potential target are judiciously chosen so as to reasonably represent actual target performance, then it is assumed that for any maneuvers that would traditionally cause a conventional tracker to lose the target, the target will appear in the volume of maneuver gate 10, that is within the volume bounded by surfaces 12 and 14.

It is noted that if the target should be at position X at scan i-1 and for scan i at a position that is closer to the ordinate and lying within the volume bounded in part by surface 12, then a conventional tracking system should be able to adequately handle detection and processing of the target, because ending at such a position for scan i indicates that any maneuvering between scan i-1 and scan i position was modest with respect to the maximum estimated maneuvers anticipated by maneuver gate 10. Further, because of the way in which surfaces 12 and 14 are determined, they are each ellipsoidal. This reduces the volume of gate 10 over conventional gates which are typically of a parallelopiped or spherical shape. Further, conventional gates are not applied in the coordinate frame of a target, but rather are applied in the coordinate frame of the tracker or sensor. The reduced volume of gate 10 with respect to conventional gates and application of gate 10 in the target coordinate system, reduces the probability of false alarms without compromising detection capability.

By using the values for velocity, maximum acceleration and scan time to determine the boundaries of gate 10 as indicated above, it has been determined that a reduction in false correlation, or false alarm rate, of about 45 to 1 on a per scan basis over a conventional rectangular parallelopiped correlation gate and of about 24 to 1 on a per scan basis over a conventional spherical correlation gate with their respective centers located at predicted target position point 18, may be achieved by employing gate 10 in accordance with the present invention.

Should the target X be detected at point 26 at scan i, then its predicted straight course may be extrapolated along broken line 25 that extends between point 20 and 26 and beyond. Correlation gate 10 may now be reoriented for scan i+1 so that the abscissa lies coincident with line 25 and point 18 lies at the scan i+1 projected position of target X along line 25.

In general, an equation of the form:

$$\frac{(u + u_j)^2}{u_j^2} + \frac{v^2}{v_j^2} = 1$$

describes an ellipse with semi-axis radii $u_j$ and $v_j$ and with a center location along the u axis at $u = -u_j$.

In order to determine whether a target lies between surfaces 12 and 14, the following relationships are analyzed. For purposes of this discussion a subscript of 1 will refer to surface 14 parameters and a subscript of 2 will refer to surface 12 parameters. Then surfaces 14 and 12 may be represented by $$r_1 = \frac{(u + u_1)^2}{u_1^2} + \frac{v^2}{v_1^2}, \quad (1)$$

$$r_2 = \frac{(u + u_2)^2}{u_2^2} + \frac{v^2}{v_2^2}, \quad (2)$$

wherein the semi-axis radii $(u_j, v_j)$ are given by:

$$u_1 = \pi * \frac{SPEED^2}{ANLIM} \quad (3)$$

$$v_1 = 2 * \frac{SPEED^2}{ANLIM} \quad (4)$$

$$\left. \begin{array}{l} u_2 = \frac{SPEED^2}{ANLIM} * \left( \frac{ANLIM}{SPEED} * T - 1 \right) \\ v_2 = \frac{SPEED^2}{ANLIM} * \left( \frac{ANLIM}{SPEED} * T + 1 - \frac{\pi}{2} \right) \end{array} \right\}, \text{if } \frac{ANLIM}{SPEED} * T \geq \frac{\pi}{2}, \quad \begin{array}{l}(5)\\ (6)\end{array}$$

$$\left. \begin{array}{l} u_2 = 1.911 + 2.331 * SPEED - 1.712 * SPEED^2 \\ v_2 = 0.599 + 7.369 * SPEED - 3.038 * SPEED^2 \end{array} \right\}, \text{if } \frac{ANLIM}{SPEED} * T < \frac{\pi}{2}, \quad \begin{array}{l}(7)\\ (8)\end{array}$$

wherein
SPEED = target speed (km/sec),
AHLIH = maximum target acceleration (km/sec$^2$), and
T = scan time (sec).

The first set of equations above for semi-axis $u_2$ and $v_2$, that is for equations (5) and (6), represents an exact solution for the condition set forth in the if function to the right of equations (5) and (6). The second set of equations above for semi-axis $u_2$ and $v_2$, that is for equations (7) and (8), represents an approximation based on a least squares analysis of the resulting curves, or ellipses, for the condition set forth in the if function to the right of equations (7) and (8).

The distance between a perpendicular from the measured target position 26 at scan i and the predicted target position 18 for scan i is represented by U, and V is the distance between measured target position 26 and the abscissa or line connecting point 18 and 20. The target position and predicted target may be represented in cartesian coordinates by x, y and z values in the sensor or tracker coordinate system with appropriate subscripts to indicate measured (m) and predicted (p) values. The parameters $u_1$, $v_1$, and $r_1$, are a first set of respective functions of the target speed and target maximum acceleration, while the parameters $u_2$, $v_2$ and $r_2$ are a second set of respective functions of the target speed and target maximum acceleration.

U and V are defined as orthogonal position error components between the detection position minus the target predicted position as measured in the target downrange versus crossrange coordinate axis. U is the downrange error, that is, the error component of range measured along, or tangential to, the historical velocity vector of the target. V is the crossrange error, that is, the error component of range measured perpendicular to the historical velocity vector of the target. U may also be seen to be the projection of the position error vector 29 onto the direction cosine vector, which is a unit vector defining the direction of the target and is also the direction of the historical velocity vector. The value of U may be determined by taking the dot product of the position error and direction cosine vectors. The value of V may then be determined by taking the square root of the magnitude squared of the position error vector minus the squared value of U.

To determine whether point 26 and therefore target X lies within the volume of gate 10 at scan i, the following tests are performed. Equation (1) is evaluated by substituting values for $u^2$, $v^2$, $u_1^2$ and $v_1^2$ and determining the value of $r_1$. If $r_1$ is greater than 1, then point 26 lies beyond surface 14 from the abscissa. Equation (2) is likewise evaluated by substituting values for $u^2$, $v^2$, $u_2^2$ and $v_2^2$ and determining the value of $r_2$. If $r_2$ is less than 1, point 26 lies inside surface 12 toward the abscissa. Thus, if $r_1$ is greater than 1 and $r_2$ is less than 1, point 26 lies between surfaces 12 and 14. Point 26 may then be declared the position of target X at scan i and the extrapolation between point 20 and 26 and reorientation of correlation gate 10 described above may be performed.

When $r_1$ equals 1, then equation (1) is the equation of surface 14 and when $r_2$ equals 1, then equation (2) is the equation of surface 12.

Generally, a tracking system will only examine maneuver gate 10 for a potential detection to track correlation if the system does not determine correlation between the target being tracked and a detection by using a conventional tracking scheme, which may include one or more conventional correlation gates. Conventional correlation gates, especially as their size and volume which they monitor increase, suffer from a high likelihood of performing a false correlation, and thereby increasing the false alarm rate. Gate 10 serves to minimize potential loss of target track without overburdening the target processing capabilities of the tracking system while maintaining an acceptable false alarm rate.

Thus, maneuver correlation gate 10 effectively recognizes the occurrence of a target maneuver that occurs over the duration of a scan. Correlation gate 10 is shaped and sized to cover only the volume into which the target can maneuver, or is expected to be able to maneuver, as determined by the system designer or by operator inputs. The shape and size of the gate adapts to track estimates of target speed and expected maximum acceleration capability of the target as may be supplied by the operator. The coverage volume of maneuver gate 10 reduces the possibility of track seduction through an incorrect correlation with random clutter, noise detection or another target. Recognition of the target maneuver by determining that the target is within the volume monitored by gate 10 may be followed by immediate corrections or updates to the tracker position and velocity state vectors of the tracking system.

Targets may be tracked in an east, north, and local vertical (positive up) inertial cartesian coordinate frame which has its origin at the sensor or ownship. This is a convenient and accurate reference frame for computing scan to scan target movement. Of course, other axes may be selected by the system designer if desired. Future target position at scan i in cartesian coordinates may be determined by linear extrapolation of target position along the target velocity vector of scan i-1.

Maneuver correlation gate 10 in accordance with the present invention provides that data from a slow scanning sensor will be adequate to maintain track on highly maneuverable targets. Maneuver gate 10 extends over a correlation volume that is determined by the regions into which a real target can be expected to maneuver over the duration of one scan interval based on its measured speed and apriori predictions of its range of possible accelerations.

Figure 2:
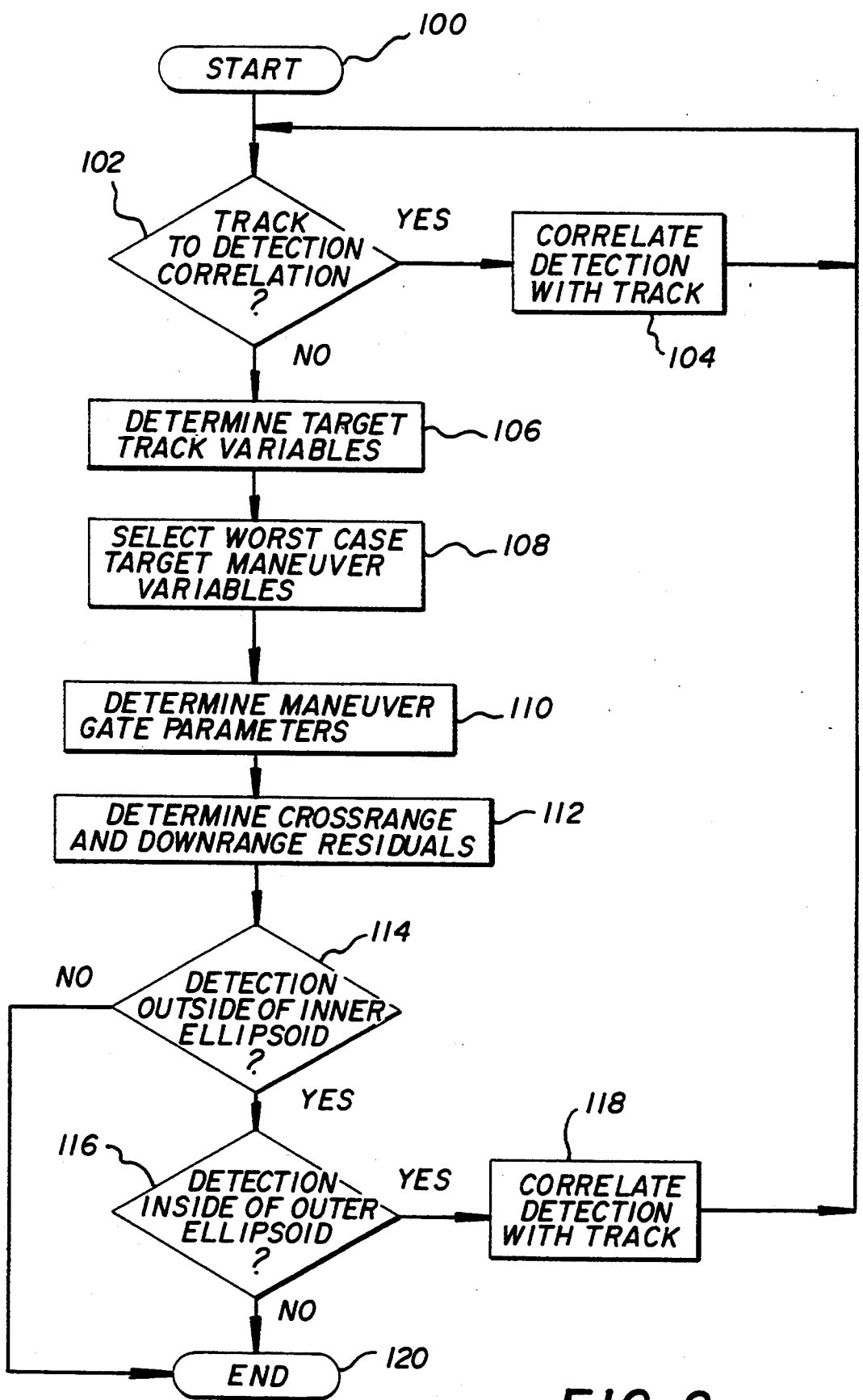
FIG. 2 is a flow chart of a method for tracking a maneuvering target in accordance with the present invention.

Referring to FIG. 2, a flow chart of a method for tracking a maneuvering target in accordance with the present invention is shown. The method of FIG. 2 may be programmed to be used with a conventional tracking system as is known in the art and may employ hardware analogous to such conventional system.

The program starts at step 100 and proceeds to execute step 102. Step 102 checks if there is track to detection correlation between the target being tracked and a detection, such as may be determined by conventional correlation gates. If there is correlation, then the YES path is followed and step 104 is performed to correlate the detection with the track. The program returns to step 102 which is repeated for another detection. If step 102 determines that there is no correlation, indicating that track has been at least temporarily disturbed or lost, then the NO path is followed and step 106 is performed.

Performance of step 106 determines, such as by computing, variables of the target being tracked. These variables may include target speed, predicted position, direction cosines and residual range errors in sensor coordinates. Execution of step 108 selects or computes the expected worst case target maneuver variables, which may include maximum normal acceleration, turn radius, turn angle for a predetermined speed and tangential deviation.

Execution of step 110 determines, such as by computing, parameters of the maneuver gate in accordance with the present invention. Such parameters may include: semi-axis center location, crossrange radius and downrange radius for the inner and outer ellipsoid, respectively.

Performance of step 112 determines the crossrange residual V and the downrange residual U, such as by computing the dot product of the residual range error in sensor cartesian coordinates with the direction cosine vectors so that the resulting U residual is in downrange coordinates. The magnitude of the residual V may then be determined by using the Pythagorian theorem as noted above.

Execution of step 114 determines if the detection lies outside of the inner ellipse of the maneuver gate. If the detection does lie outside the inner ellipsoid, then the YES path is followed and step 116 is performed. Performance of step 116 determines if the detection lies inside of the outer ellipsoid of the maneuver gate. If the detection does lie inside the outer ellipsoid, then the YES path is followed and execution of step 118 correlates the detection to the track under consideration. After performance of step 118, the program returns to repeat step 102 for another detection.

If the detection does not lie outside the inner ellipsoid when step 114 is performed, or inside the outer ellipsoid when step 116 is performed, then the respective NO path from step 114 or 116 is followed to execute step 120, which indicates that the program is at an end. The program may be restarted at step 100, if desired.

Proceeding along a NO path from step 114 or 116 indicates that the detected object is not within the volume being monitored by maneuver gate 10, and is therefore unable to be correlated with the target by use of maneuver gate 10, although other components of the tracking system may be available to provide correlation if such correlation is appropriate.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for correlating data from a slow scan sensor with a target for maintaining tracking of the target during target maneuvering, comprising:
   providing a maneuver gate to monitor a predetermined volume disposed about a velocity vector of the target, the velocity vector available from a historical track of the target, wherein the volume is bounded by inner and outer intersecting ellipsoids;
   examining the data for a potential detection when target correlation has been disturbed; and
   correlating the target with the detection when the detection lies within the volume.

2. The method as in claim 1, wherein the volume is symmetrically disposed about the vector.

3. The method as in claim 1, wherein one ellipsoid represents the loci of an object after proceeding in the direction of the vector for a first predetermined time and then proceeding in a turn having a first predetermined acceleration for a second predetermined time.

4. The method as in claim 3, wherein the first time precedes the second time.

5. The method as in claim 3, wherein the first acceleration is constant and has a value equal to the maximum acceleration that a predetermined target is expected to be able to achieve.

6. The method as in claim 3 wherein the first time precedes the second time for the one ellipsoid and further wherein the second ellipsoid represents the loci of the object after proceeding in a turn having a second predetermined acceleration for a third predetermined time and then proceeding in a straight path for a fourth predetermined time.

7. The method as in claim 6, wherein the second acceleration is constant and has a value equal to the maximum acceleration that a predetermined target is expected to be able to achieve.

8. The method as in claim 3, wherein the sum of the first and second time is a scan interval of a tracking system.

9. The method as in claim 6, wherein the sum of the first and second time is a scan interval of a tracking system and further wherein the sum of the third and fourth time is a scan interval of the tracking system.

10. The method as in claim 1, wherein the volume is a volume of revolution with the axis of revolution lying coincident with the vector.

11. The method as in claim 1, wherein the step of correlation includes:
   determining if the detection is outside the inner ellipsoid;
   determining if the detection is inside the outer ellipsoid; and
   declaring the detection to lie within the volume when the detection is both outside the inner ellipsoid and inside the outer ellipsoid.

12. The method as in claim 11, wherein the first and second determining steps include processing target information in a target coordinate system, wherein at least some of the target information is obtained from the dot product of a target direction cosine vector in a sensor coordinate system and a position error vector in the sensor coordinate system.

13. The method as in claim 1, further including:
   extrapolating between the detection lying within the volume and a prior detection of the target for generating an updated velocity vector of the target; and
   reorienting the maneuver gate to monitor the predetermined volume disposed about the updated velocity vector.

* * * * *